United States Patent
Zwickel et al.

(10) Patent No.: US 11,536,225 B2
(45) Date of Patent: Dec. 27, 2022

(54) ELECTROMAGNETIC ACTUATING DEVICE, USE AND METHOD FOR PRODUCING SAME

(71) Applicant: ETO MAGNETIC GMBH, Stockach (DE)

(72) Inventors: Rainer Zwickel, Vaihingen an der Enz (DE); Dirk Füllgrabe, Rethmar Deutschland (DE); Achim Riedle, Steißlingen (DE); Manfred Maschke, Neuhausen Steinegg (DE); Lutz Mantsch, Göppingen (DE); Holger Kraft, Mühlacker (DE)

(73) Assignee: ETO MAGNETIC GMBH, Stockach (DE)

( * ) Notice: Subject to any disclaimer, the term of this patent is extended or adjusted under 35 U.S.C. 154(b) by 368 days.

(21) Appl. No.: 16/645,193

(22) PCT Filed: Aug. 14, 2018

(86) PCT No.: PCT/EP2018/072011
§ 371 (c)(1),
(2) Date: Mar. 6, 2020

(87) PCT Pub. No.: WO2019/048196
PCT Pub. Date: Mar. 14, 2019

(65) Prior Publication Data
US 2020/0263637 A1 Aug. 20, 2020

(30) Foreign Application Priority Data

Sep. 8, 2017 (DE) .................... 10 2017 120 806.2
Jan. 19, 2018 (DE) .................... 10 2018 101 230.6

(51) Int. Cl.
*F02M 21/02* (2006.01)
*F02M 51/00* (2006.01)
(Continued)

(52) U.S. Cl.
CPC ...... *F02M 21/0254* (2013.01); *F02M 51/005* (2013.01); *F02M 51/0614* (2013.01);
(Continued)

(58) Field of Classification Search
CPC ............. F02M 21/0254; F02M 51/005; F02M 51/0614; F02M 63/0019;
(Continued)

(56) References Cited

U.S. PATENT DOCUMENTS 4,258,749 A * 3/1981 Mayer ................. F16K 31/0665
137/881
4,568,021 A * 2/1986 Deckard .............. F02M 59/366
239/585.1
(Continued)

FOREIGN PATENT DOCUMENTS

CN 205900226 U 1/2017
DE 3844642 A1 5/1990
(Continued)

OTHER PUBLICATIONS

International search report for patent application No. PCT/EP2018/072011 dated Dec. 3, 2018.

*Primary Examiner* — John Bastianelli
(74) *Attorney, Agent, or Firm* — Bachman & LaPointe, P.C.

(57) ABSTRACT

An electromagnetic positioning device includes an armature member for actuating a positioning partner and movable in an armature space relative to a stationary core (30). The armature member conducts magnetic flux upon energization of a stationary coil (32). The coil has a coil support with a winding and at least one external contactable connector (46) embedded at least in sections in the core and/or surrounded by the core. The core has an end surface (34), which is planar at least in sections, for interacting with the armature mem-
(Continued)

ber. The core and the coil are embedded in and/or surrounded by a one-piece pot-like and/or cup-like housing (38) made of a material suitable for deep-drawing in such a manner that the core rests on a membrane-like, continuous and closed base section of the housing, the base section realizing a boundary surface of the armature space.

17 Claims, 1 Drawing Sheet

(51) Int. Cl.
| | |
|---|---|
| F02M 51/06 | (2006.01) |
| H01F 7/127 | (2006.01) |
| H01F 7/128 | (2006.01) |
| H01F 7/16 | (2006.01) |
| F02M 63/00 | (2006.01) |
| F16K 27/02 | (2006.01) |
| F16K 31/06 | (2006.01) |
| H01F 7/08 | (2006.01) |

(52) U.S. Cl.
CPC ....... *F02M 63/0019* (2013.01); *F16K 27/029* (2013.01); *F16K 31/0655* (2013.01); *F16K 31/0675* (2013.01); *H01F 7/127* (2013.01); *H01F 7/128* (2013.01); *H01F 7/1638* (2013.01); *F02M 2200/8046* (2013.01); *H01F 2007/083* (2013.01)

(58) Field of Classification Search
CPC . F02M 2200/8046; H01F 7/127; H01F 7/128; H01F 7/1638; H01F 2007/083; F16K 27/029; F16K 31/0655
USPC .................................. 251/129.16; 239/585.1
See application file for complete search history.

(56) References Cited

U.S. PATENT DOCUMENTS

| | | | | |
|---|---|---|---|---|
| 4,922,965 | A * | 5/1990 | Meister | ............... F16K 31/0606 |
| | | | | 251/129.21 |
| 5,339,063 | A | 8/1994 | Pham | |
| 2011/0155936 | A1* | 6/2011 | Ellwein | ................... H01F 7/081 |
| | | | | 29/890.13 |
| 2016/0301682 | A1 | 10/2016 | Roth et al. | |
| 2016/0307682 | A1* | 10/2016 | Girlinger | ............ F16K 31/0675 |

FOREIGN PATENT DOCUMENTS

| | | |
|---|---|---|
| DE | 102013224719 A1 | 6/2015 |
| DE | 102014226421 A1 | 6/2016 |
| DE | 102017103799 A1 | 8/2018 |
| EP | 2194632 A1 | 6/2010 |
| WO | 2016096528 A1 | 6/2016 |

* cited by examiner

ELECTROMAGNETIC ACTUATING DEVICE, USE AND METHOD FOR PRODUCING SAME

BACKGROUND OF THE INVENTION

The present invention relates to an electromagnetic positioning device. Furthermore, the present invention relates to a use of such an electromagnetic positioning device, and the invention relates to a method for producing such an electromagnetic positioning device.

Generic positioning devices are generally known from the state of the art; for instance, armature means which are realized for actuating a valve, i.e. for opening or closing valve assemblies such as a valve seat in a controlled manner, are moved relative to stationary core means, which conduct magnetic flux, as a reaction to an energization of stationary coil means, such a positioning method being suitable and realized for a plurality of specific applications and for fluids to be switched or to be controlled, for example if it is realized as an electromagnetic valve.

As technical state of the art, corresponding to DE 10 2017 103 799 of the applicant, which was undisclosed at the date of the application, FIG. 4 shows a two-piece electromagnetic core 10, 12 as a static assembly of an electromagnetic positioning device, its end surface 16, which is realized on one axial end with respect to a longitudinal axis 14, forming a partial limitation of an armature space, flat armature means 18 being guided so as to be movable relative to the core and thus to surface 16 in said armature space. More precisely, FIG. 4 shows a component of an electromagnetic gas valve (also known as "injector valve" in a specific embodiment for an automotive context), in which armature 18, which is movable relative to core 10, 12 along axial direction 14, driving a needle-like plunger (not shown in the figure) which is able to close a nozzle which is suitably provided for introducing or releasing the gas to be switched.

Additionally, FIG. 4 shows that a coil assembly 20 is embedded in the two-piece core, which is realized in a substantially cylindrical manner around axis 14, in such a manner that a winding support 22 (typically made of a polymer material by injection-molding) supporting a winding 24 which is suitably made of a coated copper wire is embedded in a pot-like outer shell 12 of the core. Winding 24 is led out of the metallically conducting core via a pair of connector contact pins 26, the pair of contact pins 26 being accommodated, in a suitably isolated manner, at a section between outer shell 12 of the core and an inner core body 10, as can be seen in the sectional view of the figure.

For the installation of the known device according to FIG. 4, coil support 20 equipped with the winding is inserted into outer shell 12 of the core together with inner assembly 10 of the core, said outer shell 12 of the core having a base section for realizing end surface 16, said base section having a low wall thickness and being realized in one piece and also being made of the magnetically conducting core material. The low wall thickness in the base of core assembly 12 ensures that a saturation occurs in the section of the electromagnetic or coil-magnetic circuit flux flowing through the base section when winding 24 is energized, disadvantageous magnetic short-circuit effects thus being largely avoided in the device shown in FIG. 4.

As can also be seen, if the intended automotive use is to switch hydrogen as a fluid for a fuel cell, the single-piece, cup-like realization of outer core assembly 12 effectively protects coil support assembly 22 provided with copper wire winding 24 from harmful effects of the reactive gas: it is de facto impossible that gas from the armature space can enter the inside of pot-like core assembly 12.

Despite all functional advantages with respect to the described field of application, the expenditure for the production of the known device of FIG. 4 is high: in general, producing pot-like core assembly 12 as a turned part is complex (made more difficult by the fact that the silicon-alloyed metal material which is usually used is hard and thus difficult to machine), and producing and adjusting inner assembly 10 of the core also requires a lot of effort, in particular with respect to a contact-isolated installation of connector pair 26 between the components of the core. The device shown in FIG. 4 can thus be used in an effective manner in order to prevent the entering of a fluid (e.g. hydrogen peroxide) which is potentially harmful to enameled copper wire of coil winding 24, but the described material and production properties of said technology demonstrate the limited economic efficiency, in particular with respect to a large-scale production of such positioning devices.

From WO 2016/096258 A1, another electromagnetic positioning device (also as an electromagnetic valve device) is known, said positioning device having a different approach to protecting coil means embedded in a core assembly from effects of a gas flowing in a gas space (armature space) in front of the core unit. Instead of accommodating the coil support and the winding as a core assembly in a closed, cup-like pot as explained in the context of FIG. 4, a (gas-tight) membrane is applied to the entire surface of the corresponding end face of the core body according to WO 2016/096258 A1, said membrane being made of a magnetically non-conductive material and thus ensuring the desired sealing without any impact on the conditions of the conduction of the magnetic flux at or in the core.

Although the machining expenditure for the pot assembly (FIG. 4) in particular can be reduced, said alternative solution presents new and additional problems: it must be ensured that the membrane surface of the state of the art according to WO 2016/096258 A1 is fixed in a reliable manner on the corresponding end face of the core and, additionally, that said membrane is sealed against the entering fluid—potentially across the entire surface. If a plastic membrane is used, additional degradation effects are caused by a highly reactive gas. If a metal membrane is used, challenges concerning production and sealing rise; (merely) selective welding would require an additional seal, whereas annular (and therefore potentially circumferentially sealing) welding entails the risk of distortion and, accordingly, to mechanical uniformity and quality problems, which results in additional requirements for quality control and possible post-processing of the complex device which is produced in such a manner.

SUMMARY OF THE INVENTION

Hence, the object of the present invention is to improve an electromagnetic positioning device by means of reliable protection and sealing properties (in relation to the winding provided on the coil support) which are particularly advantageous with respect to reactive fluids in the armature space, while still providing a device which is simple to produce, cost-efficient and improved, in particular, for production suitable for large-scale applications.

Said object is attained by the electromagnetic positioning device having the features disclosed herein; advantageous embodiments of the invention are also disclosed herein and in the dependent claims. Within the scope of the invention, additional protection is sought for a use of the electromagnetic positioning device according to the invention for switching and/or metering a hydrogenous fluid, an additional preferred use relating to the context of automotive technology, in particular to fuel cell technology. Furthermore, protection is sought within the scope of the invention for a method for producing the electromagnetic positioning device according to the invention (disclosed features relating to the product are also seen as disclosed relating to an embodiment of the method).

In an advantageous manner according to the invention, the core means which comprise the coil means—provided with the winding—in an at least partially embedded manner are surrounded and/or enclosed by a pot-like and/or cup-like housing made of a non-magnetic material in such a manner that the core means rest on a membrane-like, continuous and closed base section of the housing. By analogy with the state of the art according to the preamble, said base section of the housing realizes a boundary surface of the armature space, but according to the invention, said base section is made of a non-magnetic material, preferably a metal material and more preferably a metal suitable for deep-drawing, such as a stainless steel sheet.

In an advantageous manner according to the invention, the pot-like or cup-like housing effectively protects the coil means and the winding accommodated therein from the effects of reactive gases from the armature space, allowing the use of complex sealing structures in particular to be avoided when several assemblies or components are connected. The one-piece pot-like or cup-like housing, more preferably produced in a cost-efficient manner by deep-drawing or by means of other large-scale production technologies, does not only allow for simple and effective sealing, but also realizes significant production and cost advantages.

According to the invention, a complete sealing of coil means provided or to be provided inside the pot-like or cup-like housing is realized in the installed state in a simple manner with respect to the mechanics and the production; aggressive, reactive gaseous fluid cannot penetrate the one-piece base section made of the housing material and reach the coil support and the winding provided on said coil support. The electromagnetic positioning device according to the invention can thus be used in an excellent manner for realizing a valve function, for example for switching or metering a gaseous reactive fluid such as hydrogen.

In an advantageous embodiment within the scope of the invention, the membrane-like, continuous and closed base section of the housing does not only have the described advantageous sealing effects in conjunction with simple producibility, but the (thin) membrane nature of said base section also ensures that a caused (or enlarged) working gap between the core means and the armature means is not affected by the (magnetically non-conductive) material of the housing; in particular, it does not significantly weaken the efficiency in the magnetic circuit flux.

In an advantageous manner with respect to production, the core means are realized as a plurality of stacked sheet metal elements which are produced, in particular, by punching or a comparable production method suitable for large-scale applications. A core assembly which is realized as such a stack of individual punched metal sheets has particularly advantageous magnetic properties and prevents the formation of eddy currents.

In an alternative embodiment, the core means are realized as bodies made of sinter material instead of sheet metal elements.

Compared to core materials produced by means of machining methods such as turning or milling, such a body can be produced in a more cost-efficient manner and has a larger magnetically effective material mass compared to laminated core materials. The disadvantage of a higher sensitivity with respect to the harmful effects of reactive gases is counteracted by means of the embodiment according to the invention comprising the one-piece pot-like and/or cup-like housing.

Furthermore, both in a core sheet metal stack and in a body made of sinter material, the embedding or surrounding of the coil support and the winding according to the invention can be realized in a simple manner in the form of suitable profiling, recesses etc., for example, not only the plane end surface of the core means being realizable, but, in an embodiment, an end surface of the coil support being also located in said plane if the geometry of the components involved is realized in a suitable manner, the assembly thus being able to rest on the base section of the housing in a simple manner with respect to the production and in a magnetically optimized manner.

In an advantageous embodiment, the core means (comprising the inserted coil means) realized as stacked sheet metal elements or as bodies made of sinter material are surrounded by a suitable polymer encapsulation or by an encapsulation which is made of a conventional resin or plastic material for optimizing the production and further improving the protection of the winding, in particular, said encapsulation also allowing for a positive mechanical engagement with the inside of the pot-like or cup-like housing; if the inner contour of the housing is hollow and cylindrical, the encapsulation has a corresponding cylindrical external shape.

Additionally, the encapsulation allows for the integral formation or realization of a plug or socket section (more preferably contactable in a mechanical or electrical manner by means of conventional, standardized plugs), the tightness and the suitability for large-scale production of the positioning device produced according to the invention thus being improved in this way, too. Further preferably, the housing or the encapsulation is axially measured or realized in such a manner that at least one connector (more preferably realized as a pair of contact pins in a manner known per se) projects from the housing from an direction opposite to the base section of the housing and that said connector can be contacted in said axial position (a contacting also being realizable with respect to a connector still located in the housing).

In an advantageous embodiment within the scope of the invention with respect to the production, the housing is produced by deep-drawing a non-magnetic metal or steel material. In this manner, said assembly for realizing the invention can be produced in a cost-efficient manner and the deep-drawing offers the possibility to realize a thickness of the base section, see above, in such a manner that the desired protective effect for the winding accommodated inside the housing is ensured; additionally, the deep-drawing allows reducing the thickness to a minimum which optimizes the magnetic properties of the device. In particular, V2A or a comparable alloy steel material can be used for such a deep-drawing in an advantageous manner according to an embodiment.

In general, such a positioning device can be used for any positioning applications, but is particularly suitable for realizing a gas-switching valve (there being particular suitability for a highly reactive fluid). Hence, according to the invention, the invention is intended to be used in the form of an injector valve for switching or metering a hydrogenous fluid, without thus limiting the scope of application of the invention, however. In fact, the present invention can be used in any form of an electromagnetic positioning device in which armature means (in particular and preferably realized as flat armatures) open or close a valve seat (as a possible positioning partner) in a suitable manner, other fluids being generally switchable or meterable in addition to gaseous fluid.

Furthermore, the above description of the invention and of the embodiments shows that the invention allows for an advantageous and optimized production of the electromagnetic positioning device which is characterized by improved automatization capability and thus potentially better (i.e. more cost-efficient) large-scale production capability compared to the generic state of the art. In particular, the present invention allows the coil support according to the invention to be provided with the winding according to the invention in order to insert said coil means into the core means in such a manner that the coil means are at least in sections embedded in and/or surrounded by the core means. A following method step according to the invention provides that the core means comprising inserted coil means are surrounded and/or encapsulated (and post-processed, if required) by a casting compound in such a manner that a body is realized which is adapted to an inside width of the pot-like or cup-like housing; more preferably, a complete positive mechanical engagement between a (radial) outside wall of the encapsulated core means and an inside wall of the housing is realized. Assemblies which are prepared in such a manner can then be joined by inserting the body which is realized by means of the encapsulation into the housing, the plane end surface of the core means then resting on the base section of the housing within the scope of the invention.

Although the encapsulated body is preferably inserted into housing 38 for the purpose of installation as described above, it is also possible to realize the encapsulation in an alternative manner by filling the interior of the housing when the core means and the coil means are inserted.

BRIEF DESCRIPTION OF THE DRAWINGS

Further advantages, features and details of the invention can be derived from the following description of preferred exemplary embodiments and from the drawings.

DETAILED DESCRIPTION

Figure 1:
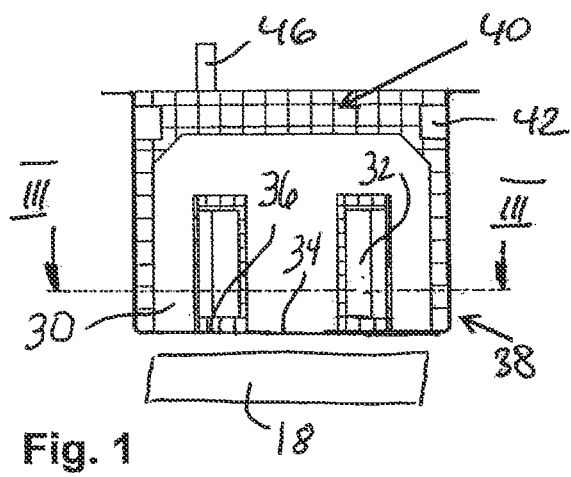
FIG. 1 is a longitudinal sectional view of the core means of an electromagnetic positioning device according to a first preferred exemplary embodiment.
Figure 2:
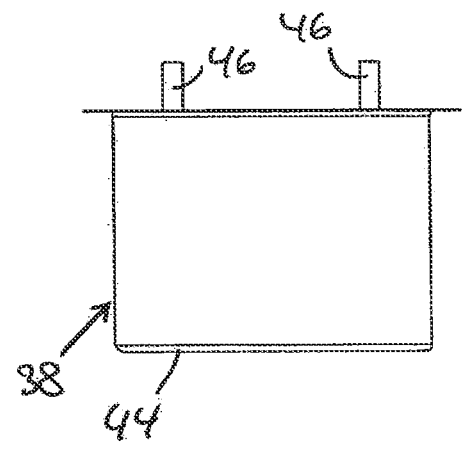
FIG. 2 is a lateral view of the pot-like or cup-like housing in the exemplary embodiment of FIG. 1 (a position being turned 90° about a longitudinal axis)
Figure 3:
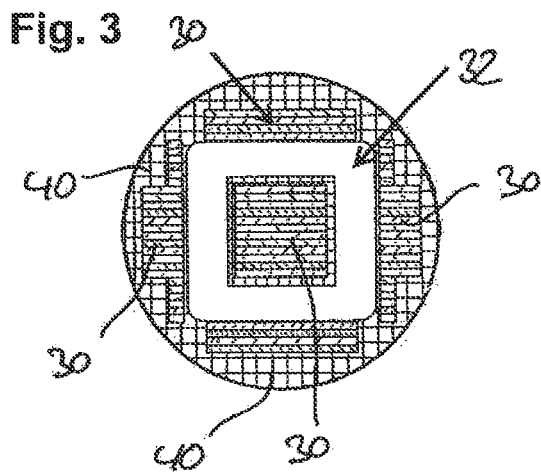
FIG. 3 is a cross-sectional view along the sectional plane III-III of FIG. 1.
Figure 4:
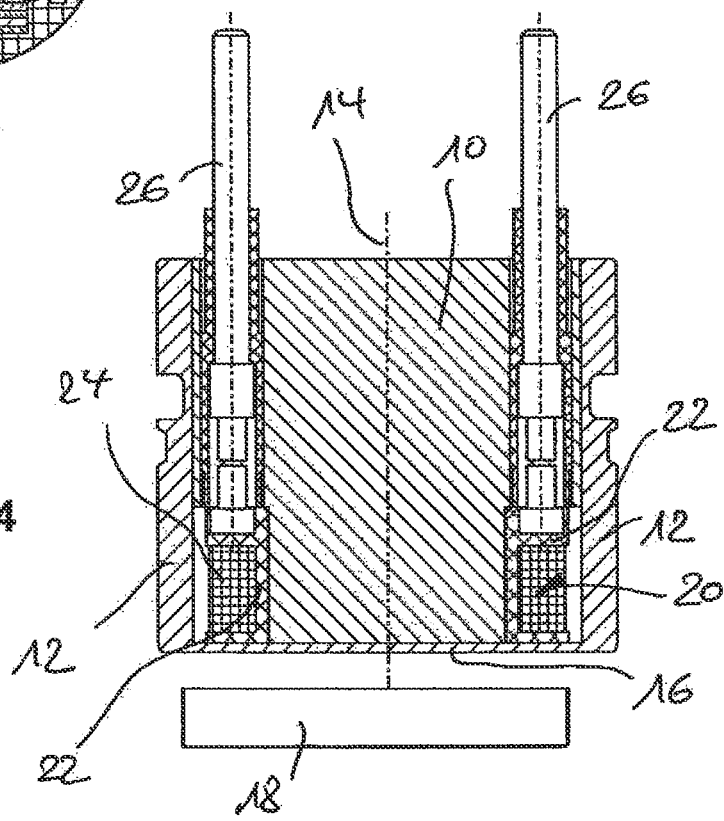
FIG. 4 is a schematic longitudinal sectional view of an exemplary realization according to the state of the art of core means of an electromagnetic valve device as an injector valve for gaseous media and (flat) armature means disposed in a schematic manner.

Concerning the description of the exemplary embodiment of FIGS. 1 to 3, assemblies and functional units which are analogous to or identical with FIG. 4 are referenced with identical reference numerals; additionally, by analogy with FIG. 4, the core unit (core means) of FIGS. 1 to 3 would also interact with an armature unit 18 (FIG. 1) opposite the base section, said armature unit again having the desired positioning function or valve function in a manner known per se, for example in an aforementioned manner by interacting with plunger means for actuating an injector for gaseous media in the automotive sector.

In FIG. 1 and FIG. 3, installed core unit (core means) 30 is realized in an exemplary manner as a stacked assembly of a plurality of transformer sheets which are realized in the shape of an E in about the central area (and thus for insertion into a polymer coil support 32 which has a square cross-section) and which realize an end surface 34 of the stack by means of the free ends of the legs. Furthermore, the longitudinal sectional view of FIG. 1 shows that said E-shape of the transformer sheets is realized in such a manner that coil support 32 is adapted to the legs of the metal sheets along its axial direction (i.e. the vertical direction in the figurative plane of FIG. 1) in such a manner that an end surface 36 is located in the same plane as plane end surface 34 of the core stack.

With respect to a realization of the core means as a body made of sinter material, the aforementioned geometrical embodiments apply in an equal manner.

The views of FIG. 1 and FIG. 3, which show the installed or joined state comprising a deep-drawn cup-like housing 38 made of stainless steel, also clarify how the described, inserted assembly of transformer sheets or sinter bodies and coil support (including the winding made of copper wire resting thereon, which is not shown in detail) is encapsulated by a thermoplastic polyamide resin 40, the encapsulation (in a preferred production in the uninstalled state, i.e. detached from housing 38) having a circumferential contour of an outer cylinder corresponding to the cylindrical inner contour of housing 38, and being located in the plane of surfaces 34, 36 along the axial direction (vertical plane of FIG. 1, FIG. 2). The sectional view of FIG. 1 also shows that a circumferential annular groove 42 realized for accommodating an O-ring seal or the like is formed in the injection polymer for improving the sealing effect of the body realized by encapsulation 40 in housing 38.

In the joined installation state of FIG. 1, the body realized by encapsulation 40 and sheet metal assembly 30 and coil support 32 rests on a plane inner surface of a base section 44 of pot-like or cup-like housing 38. By analogy with FIG. 4, said base section 44 limits an axially adjacent armature space by means of its outer surface, a flat armature 18 (such as analogous to reference numeral 18 in FIG. 4) being preferably embedded so as to be moveable in relation to said armature space and capable of performing the intended positioning or valve functions.

At the end of the housing opposite to base section 44, plug sections 46 again project from the free opening of the housing, said plug sections 46, which are preferably realized in one piece with the polymer material of encapsulation 40, allowing for the external electrical contacting and energization of the winding resting on the coil support (the corresponding wire course of the connector is not shown in the figures).

In the aforementioned manner, core means for realizing a gas valve are realized as a positioning device, said core means realizing a typical maximum outside stroke or valve stroke of approx. 0.3 mm to 0.5 mm when an exemplary housing diameter of housing 38 is approx. 21 mm and a material thickness of the housing is 0.15 mm (including the base section).

The invention claimed is:

1. An electromagnetic positioning device having armature means which are realized for actuating a positioning partner and which are movable in an armature space relative to stationary core means (30), which conduct magnetic flux, as a reaction to an energization of stationary coil means (32),
   the coil means, which have a coil support (32) provided with a winding and at least one external contactable connector (46), being embedded at least in sections in the core means and/or being surrounded by said core means
   and the core means realizing an end surface (34), which is planar at least in sections, for interacting with the armature means,
   wherein
   the core means and the coil means are embedded in and/or surrounded by a one-piece pot-like and/or cup-like housing (38) made of a material suitable for deep-drawing in such a manner that the core means rest on a membrane-like, continuous and closed base section of the housing,
   the base section realizing a boundary surface of the armature space, and wherein the core means (30) are surrounded by an encapsulation (40), the outer diameter of said encapsulation being adapted to a clear inside width of the pot-like or cup-like housing.

2. The device according to claim 1, wherein the core means (30) are realized as a plurality of stacked sheet metal elements.

3. The device according to claim 2, wherein the plurality of stacked sheet metal elements (30) are produced by punching.

4. The device according to claim 1, wherein the core means (30) are realized as bodies made of sinter material.

5. The device according to claim 1, wherein the coil support (32), which is made of a plastic material, and which supports the winding, is inserted into the core means (30).

6. The device according to claim 5, wherein the coil support (32) is an injection-molded part.

7. The device according to claim 5, wherein an end face (36) of said coil support is in contact with the base section.

8. The device according to claim 1, wherein the encapsulation realizes a plug or socket section (46) of the externally contactable connector of the coil means.

9. The device according to claim 1, wherein the encapsulation is dimensioned and realized in such a manner that the externally contactable connector projects from the housing in a direction which is opposite to the base section and/or can be externally contacted there.

10. The device according to claim 1, wherein the housing (38) is produced by deep-drawing a steel material.

11. The device according to claim 1, wherein the armature means, which are realized as flat armatures, are realized for interacting with a valve seat or for actuating plunger-like or needle-like injection means.

12. The device according to claim 11, wherein the injection means are injection means for a gaseous fluid.

13. A use of the device according to claim 1 for realizing a gas valve, the positioning partner being a valve assembly of the gas valve.

14. The use according to claim 13, wherein the positioning partner is a valve seat of the gas valve.

15. A method for producing the electromagnetic positioning device according to claim 1, comprises the steps of:
   inserting the coil support provided with the winding into the core means (30),
   encapsulating the core means comprising the inserted coil support with a casting compound in such a manner that a body is realized which is adapted to an inside width of the pot-like or cup-like housing and
   inserting the body into the housing in such a manner that the plane end surface of the core means rests on the base section of the housing.

16. The method according to claim 15, wherein a plug section or a socket section for the external contacting of the connector of the coil means is produced by the encapsulation.

17. The device according to claim 1, wherein the encapsulation (40) is a cylindrical encapsulation.

* * * * *